(12) United States Patent
Ilchenko et al.

(10) Patent No.: US 6,943,934 B1
(45) Date of Patent: Sep. 13, 2005

(54) NONLINEAR OPTICAL WHISPERING GALLERY MODE RESONATORS

(75) Inventors: Vladimir Ilchenko, La Canada, CA (US); Andrey B. Matsko, Pasadena, CA (US); Anatoliy Savchenkov, La Crescenta, CA (US); Lutfollah Maleki, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/447,673

(22) Filed: May 28, 2003

Related U.S. Application Data

(60) Provisional application No. 60/383,869, filed on May 28, 2002.

(51) Int. Cl.[7] ............................. G02F 1/35; G02B 6/26
(52) U.S. Cl. ........................................ 359/326; 385/15
(58) Field of Search ............................. 359/326–332; 385/15, 24, 27, 28, 39, 50

(56) References Cited

U.S. PATENT DOCUMENTS

| | | | |
|---|---|---|---|
| 5,231,533 A | * | 7/1993 | Gonokami et al. ......... 359/328 |
| 5,781,670 A | * | 7/1998 | Deacon et al. ............. 385/10 |
| 6,718,083 B2 | * | 4/2004 | Lopes et al. ................ 385/16 |

OTHER PUBLICATIONS

M. Kuwata-Gonokami, "Laser Emission From Dye-Doped Polystyrene Microsphere", LEOS '93 Conference Proceedings, 1993 Lasers and Electro-Optics Society Annual Meeting, San Jose CA, Nov. 1993, pp. 300-301 (paper NLO1.2).*

D.Z. Anderson et al, "Low-Order Whispering-Gallery Modes Of A BaTiO3 Disk", Summaries Of Papers Presented At 1999 Conference On Lasers And Electro-Optics (CLEO '99), Baltimore, MD, May 1999, pp. 541-542 (paper CFH6).*

S. Lacey et al, "Deformed Glass Microsphere As A Three-Dimensional Chaotic Optical Microresonator", Summaries Of Papers Presented At 2001 Quantum Electronics And Laser Science Conference (QELS '01), May 2001, p. 65 (paper QTuC2).*

Myers, et al., "Quasi-phase-matched optical parametric oscillators in bulk periodically poled LiNbO$_3$", *J. Opt. Soc. Am. B*, vol. 12, No. 11, pp. 2102-2116, Nov., 1995.

* cited by examiner

*Primary Examiner*—John D. Lee
(74) *Attorney, Agent, or Firm*—Fish & Richardson, P.C.

(57) ABSTRACT

Whispering gallery mode (WGM) optical resonators comprising nonlinear optical materials, where the nonlinear optical material of a WGM resonator includes a plurality of sectors within the optical resonator and nonlinear coefficients of two adjacent sectors are oppositely poled.

25 Claims, 6 Drawing Sheets

FIG. 3
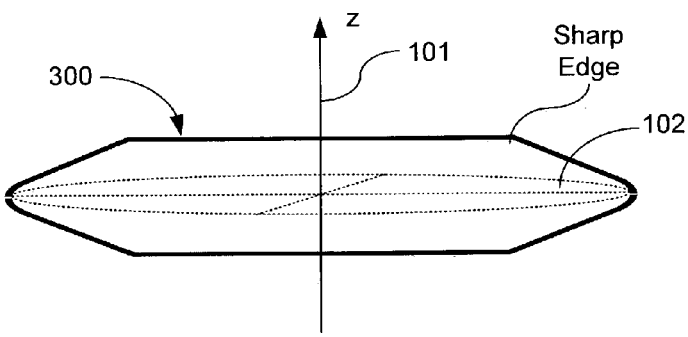
FIG. 4A    FIG. 4B
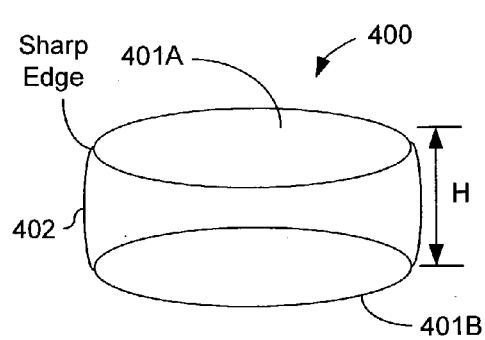 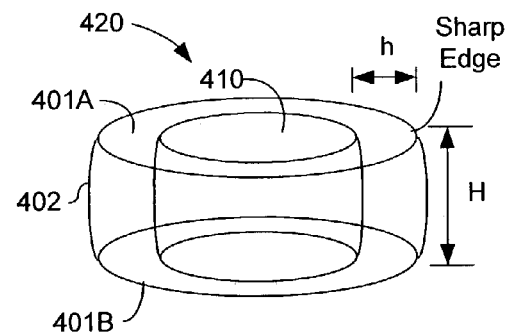
FIG. 5A    FIG. 5B
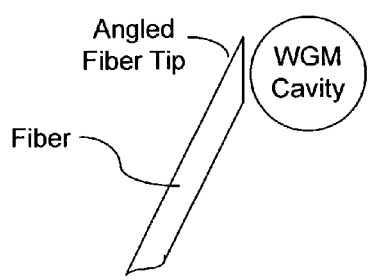 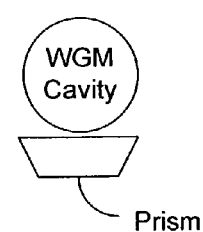

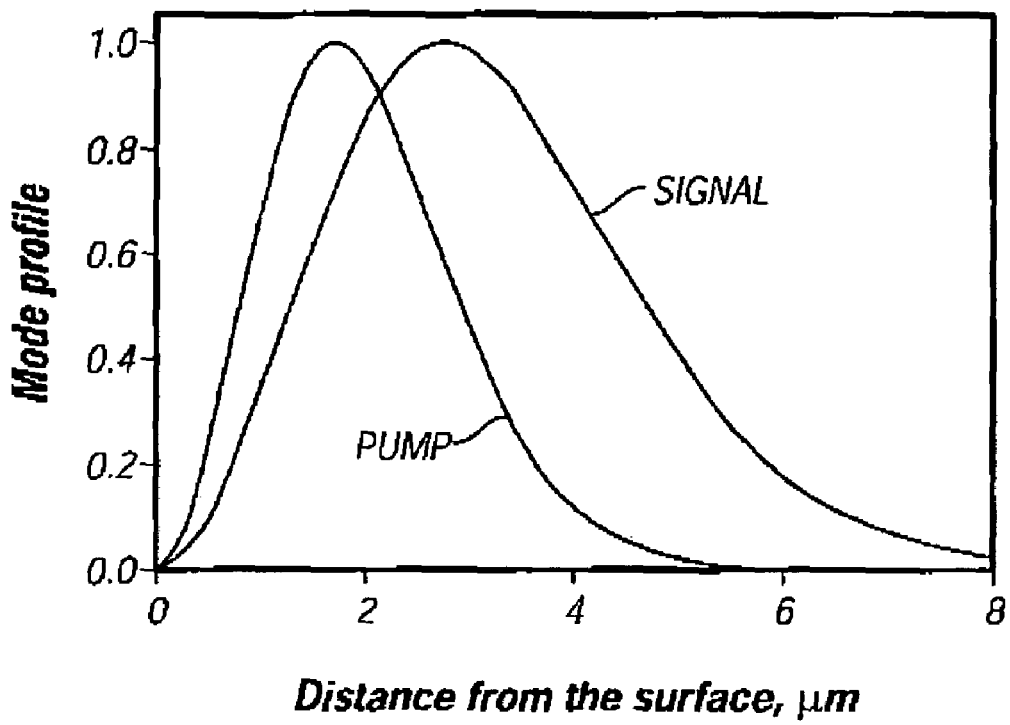
FIG. 8
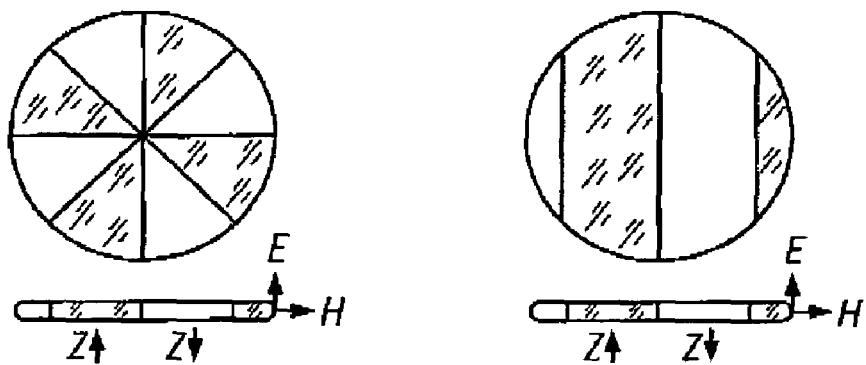
FIG. 9A  FIG. 9B

NONLINEAR OPTICAL WHISPERING GALLERY MODE RESONATORS

This application claims the benefit of U.S. Provisional Application No. 60/383,869 entitled "Parametric frequency conversion with quasi-phase matched whispering gallery modes" and filed on May 28, 2002, the entire disclosure of which is incorporated herein by reference as part of this application.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

BACKGROUND

This application relates to optical resonators and cavities, and more specifically, to optical whispering-gallery-mode ("WGM") resonators and cavities.

A dielectric material may be shaped to form an optical whispering-gallery-mode ("WGM") resonator which supports a special set of resonator modes known as whispering gallery ("WG") modes. These modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, ranging from 1000 to $10^9$ for quartz microspheres. Hence, optical energy, once coupled into a whispering gallery mode, can circulate within the WGM resonator with a long photon life time.

Such high Q values are generally difficult and expensive to obtain in conventional Fabry-Perot optical resonators formed is with mirrors. The capability of producing high Q values makes the WGM resonators useful for many optical applications, including optical filtering, optical delay, optical sensing, lasers, and opto-electronic oscillators.

SUMMARY

This application includes implementations of optical WGM resonators comprising nonlinear optical materials to allow for one or more nonlinear optical effects in the WGM resonators. In one implementation, the nonlinear optical material of a WGM resonator includes a plurality of sectors within the optical resonator and nonlinear coefficients of two adjacent sectors are oppositely poled. The sectors may be symmetrically arranged with respect to a center of the optical resonator, or may be parallel stripes across the optical resonator. The resonator may include at least part of a sphere or may have a non-spherical shape such as a spheroidal shape.

In another implementation, the nonlinear optical material of the WGM resonator exhibits a second-order nonlinear effect and includes a plurality of sectors within the resonator. The sectors are in a quasi phase matching configuration for the second-order nonlinear effect for light coupled in the resonator.

In operation, an optical beam at a first wavelength may be coupled into the optical resonator to convert light at the first wavelength into light at a second, different wavelength. Various nonlinear optical effects may be achieved, including the second harmonic generation, parametric oscillation and amplification, and optical modulation based on a nonlinear optical effect.

These and other implementations are now described in greater detail in the following figures, the detailed description, and the claims.

BRIEF DESCRIPTION OF THE DRAWINGS

FIGS. 1, 2, 3, 4A, and 4B illustrate various exemplary resonator configurations that support whispering gallery modes and are formed from nonlinear optical materials.

FIGS. 5A and 5B illustrate two exemplary evanescent couplers for a nonlinear WGM resonator.

FIG. 8 shows spatial mode profiles inside a nonlinear WGM resonator for R=0.64 mm and pump wavelength at 1064 nm, where the zero coordinate corresponds to the cavity boundary and the evanescent filed outside the resonator is neglected in the computation for high-Q WGMs.

FIGS. 9A and 9B show two exemplary designs of the oppositely poled sectors in nonlinear WGM resonators.

DETAILED DESCRIPTION

Whispering-gallery modes (WGMS) in optical microcavities provide attractive means for implementing certain nonlinear optical effects because of their small mode volumes and high quality factor Q. Among numerous nonlinear optical effects, parametric nonlinear interactions among WG modes may be achieved with a high efficiency if the WGM cavity that supports WGMs is fabricated from a low-loss nonlinear material. However, nonlinear parametric interactions are usually strongly forbidden by phase matching conditions due to the conservation of momentum of photons. This is because WGMs of a dielectric cavity that possess rotational symmetry are orthogonal to one another in momentum space. Parametric interaction occurs if the symmetry of the system is broken or modified.

One of features of the nonlinear WGM resonators described here is to facilitate efficient nonlinear optical interactions of different WG modes. As one example, the nonlinear optical material of a WGM resonator includes a plurality of sectors within the optical resonator and nonlinear coefficients of two adjacent sectors are oppositely poled. The sectors may be symmetrically arranged with respect to a center of the optical resonator, or may be parallel stripes across the optical resonator. The following sections first describe various exemplary WGM resonator configurations suitable for implementing nonlinear WGM resonators and then describe specific examples of nonlinear WGM resonators.

Figure 1:
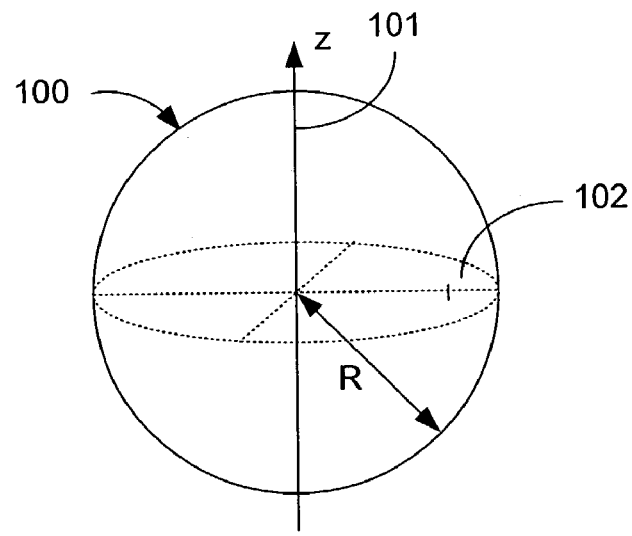
Figure 2:
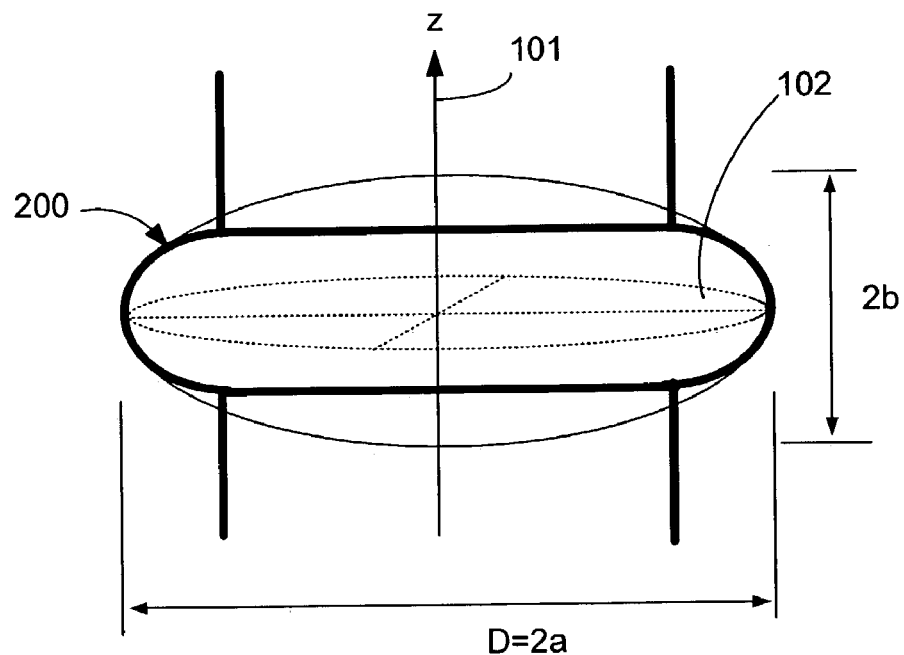

FIGS. 1, 2, and 3 illustrate three exemplary geometries for implementing the WGM resonators with nonlinear optical dielectric materials.

FIG. 1 shows a spherical WGM resonator 100 which is a solid dielectric sphere formed from a nonlinear optical material. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheroidal microresonator 200 formed from a nonlinear optical material. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

FIGS. 4A and 4B show a disk-shaped WGM resonator 400 and a ring-shaped WGM resonator 420, respectively, formed from nonlinear optical materials. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

An optical coupler is generally used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. FIG. 5B shows a micro prism as a coupler for the WGM resonator. Other evanescent couplers such as a coupler formed from a photonic bandgap material may be used. A single optical coupler may be used to couple one or more input signals into the nonlinear WGM resonator. Separate optical couplers may be used to respectively couple different input signals into the resonator. Optical coupling of an output signal from the resonator may be achieved by sharing an input coupler or by using a designated output coupler.

In WGM resonators with uniform indices, a part of the electromagnetic field of the WG modes is located at the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value.

The technical problems of creating efficient nonlinear optical wave mixing with whispering-gallery modes are caused by at least two sources: frequency-dependent dispersion of the host material of the dielectric cavity and dispersion introduced by the internal geometrical mode structure. WGMs of high orders may be understood as dielectric optical waveguides. WGMs have dispersion that depends on geometry, similarly to waveguides. The frequency of a high-order TE WGMs may be estimated from the following equation:

$$\frac{2\pi R}{\lambda}\sqrt{\varepsilon(\lambda)} + \left[\frac{\varepsilon(\lambda)}{\varepsilon(\lambda)-1}\right]^{1/2} = v + \alpha_q\left(\frac{v}{2}\right)^{1/3} + \frac{3\alpha_q^2}{20}\left(\frac{2}{v}\right)^{1/3} + O(v^{-2/3}), \quad (1)$$

where $\lambda$ is the wavelength in vacuum; $v$ is the mode order; $\epsilon(\lambda)$ is the susceptibility of the nonlinear material; R is the radius of the cavity; and $\alpha_q$ is the qth root of the Airy function $Ai(-z)$, which is 2.338, 4.088, and 5.521 for q=1, 2, and 3, respectively.

Equation (1) can be derived under the assumption that the cavity is a central part of a dielectric sphere or spheroid. As described above, because the main sequence of WGMs is localized close to the sphere equator it is possible to remove an unused part of the sphere to create a disk cavity without changing the mode spectrum. The angle distribution of the field is determined by $Y_{v,m}$ spherical functions with angular number $v$ and magnetic number m. For the main sequence of WGMs, it is assumed that m=$v$. The radial WGM profile for a spherical cavity is $\Psi(r)=J_{v+1/2}(kr)/r$, where $J_{v+1/2}(kr)$ is a Bessel function of the first kind and $v$=0, 1, 2, 3, . . . . The mode spectrum results from the boundary condition $\Psi(r)\to 0$ for r→∞ and 0. Equation (1) is valid for WGMs characterized by $v$>>1.

In fabrication of nonlinear WGM resonators, it is generally difficult to direct cut a nonlinear material such as a crystal into a desired WGM resonator shape. It may be more practical to fabricate a nonlinear optical WGM cavity by polishing the rim of a dielectric cylinder cut from a crystal wafer. The rim of such a cavity would not necessarily need to be spherical to maintain high-Q and small volume WGMs. The rim may be spheroidal or even conical in shape as discussed above. Calculation of the spectrum of an arbitrary dielectric spheroid is rather complicated. However, Equation (1) may still be used for estimating the main mode sequence in a WGM spheroidal resonator.

For example, a commercial electro-optic nonlinear crystal in a form of a flat Z-cut $LiNbO_3$ substrate may be polished to form a spheroidal WGM resonator. In this configuration, the TE modes correspond to the extraordinary waves in the nonlinear material $LiNbO_3$. Consider a degenerate optical parametric oscillator (OPO) pumped at $\lambda_P$=1064 nm. Susceptibilities for pump, signal, and idler waves in WG modes in this Z-cut $LiNbO_3$ WGM resonator are $\epsilon(\omega_p)$=4.657 and $\epsilon(\omega_s)=\epsilon(\omega_i)$=4.513, respectively. To achieve the desired phase matching condition for an efficient OPO in a bulk, congruent $LiNbO_3$, the crystal may include a series of periodic sectors along the directions of the signals where two adjacent sectors are poled to have opposite phases in their second-order nonlinear coefficients. This allows for a "quasi phase matching" condition. The desired poling periods for different sectors of $LiNbO_3$ should satisfy the following condition:

$$k_p - k_s - k_i - \frac{2\pi}{\Lambda} = 0, \quad (2)$$

where $k_p$, $k_s$, and $k_i$ are the wave vectors of the pump, the signal, and the idler optical signals, respectively. For the degenerate case, the poling period is determined by $$\Lambda = \frac{\lambda_p}{\sqrt{\varepsilon_p}-\sqrt{\varepsilon_s}} \approx 31.67 \ \mu m. \quad (3)$$

A WGM cavity fabricated from the same Z-cut $LiNbO_3$ material under a quasi phase matching condition should have a different poling period than the above bulk design because of the dependence of the mode dispersion on the WGM cavity's geometrical parameters. In general, the smaller the WGM cavity, the shorter the period.

Figure 6:
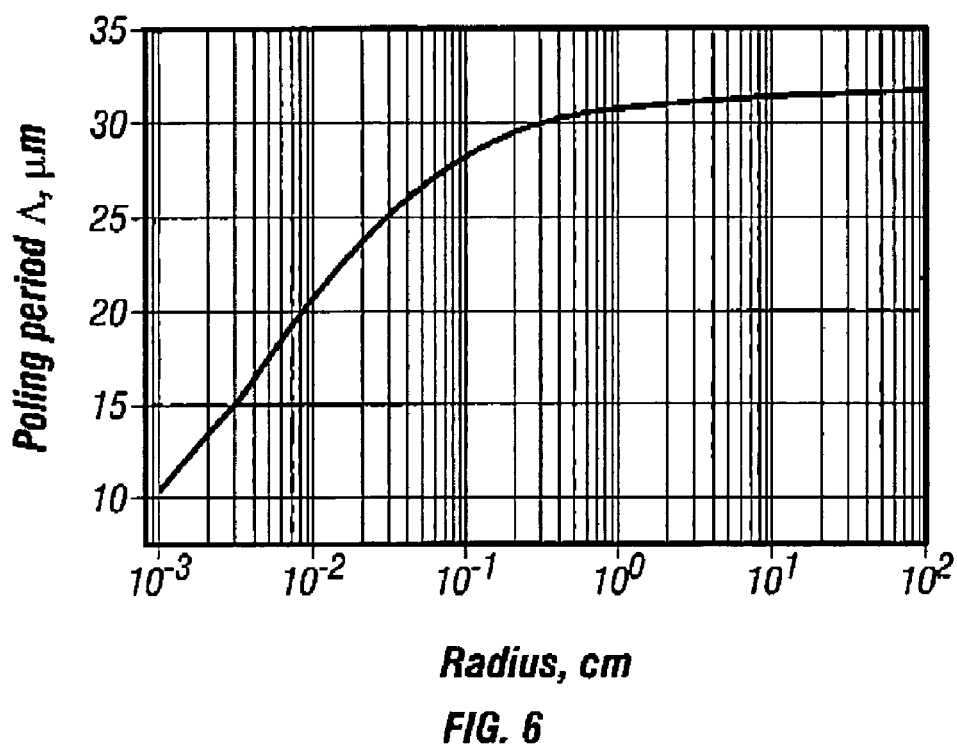
FIG. 6 shows the calculated poling period as a function of the radius of a nonlinear WGM resonator formed with a z-cut $LiNbO_3$ crystal, where the poling period decreases as the radius decreases.

FIG. 6 shows the calculated poling period of this WGM resonator as a function of the radius of the equator plane of the WGM resonator. There is no guarantee that the pump and the signal frequencies are both resonant with the cavity WG modes. To characterize this possibility, the pump is assumed to be resonant with a cavity WG mode to determine the frequency detuning as follows:

$$\frac{\Delta}{\gamma_s} = \left|\frac{\omega_p}{\tilde{\omega}_s} - 2\right|Q_s, \quad (4)$$

where $\gamma_s$ and $Q_s$ are respectively the half-linewidth and the quality factor of the signal mode, $Q_s=\omega_s/(2\gamma_s)$; $\tilde{\omega}_s$ is the frequency of the cavity WG mode that minimizes $\Delta$. If the condition of $\Delta/\gamma_s$<1 is met, the signal frequency is said to be resonant with the cavity WG mode.

Figure 7:
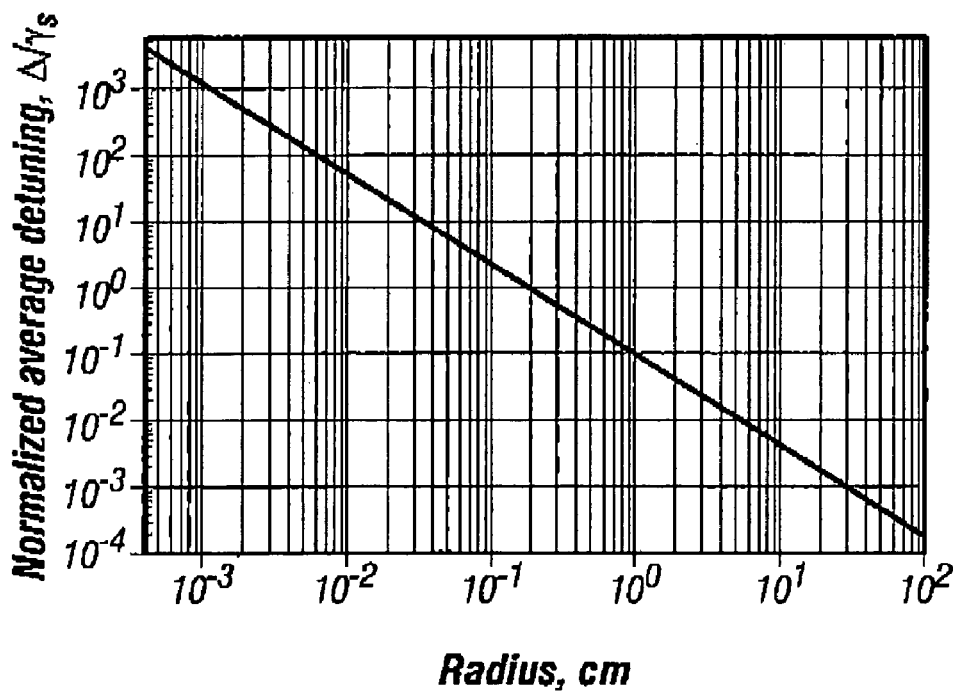
FIG. 7 shows calculated average detunings of the signal frequency from the nearest WG mode resonance frequency of a nonlinear WGM resonator formed with a z-cut $LiNbO_3$ crystal as a function of the resonator radius, where the pump field is at 1.064 μm and in resonance with a WG mode.

The dependence of the detuning on the WGM cavity radius in not simple. FIG. 7 shows the average dependence for $Q_s=10^7$. The result in FIG. 7 suggests that the smaller the WGM cavity, the less the probability that it has both resonant frequencies $\omega_p$ and $\omega_p/2$. As shown in FIG. 7, the cavity radius should exceed 2 mm for this condition to be fulfilled. However, the condition $\Delta/\gamma_s$<1 is not critical for smaller WGM cavities. The frequency difference may be compensated for by application of a DC bias electric field to the WGM cavity through proper electrodes formed on the $LiNbO_3$ WGM cavity to change the index of the crystal. This DC field moves modes of different frequencies in a different way to achieve the desired frequency matching in the system.

As a more specific example, consider a WGM cavity with a radius R of 0.64 mm to examine its main mode sequence for $\alpha_q$=2.338 in Equation (1). The mode that is resonant with the pump field has index $v_p$=8156. For the signal and idler modes, $v_s=v_i$=4004. Because $v_p-v_s-v_i$=148>1 there is no parametric interaction in the system unless the nonlinear index of refraction of the cavity material is modulated with the period determined by the number $v_x=v_p-v_s v-i$. Modulation with period $v_x$ is indeed the basis for FIG. 6, because $v_x v_s$ increases as R decreases. This periodicity also results in phase matching for degenerate parametric frequency down conversion with pump radiation of 1.056 $\mu$m, 1.049 $\mu$m, 1.041 $\mu$m, and so on.

The approximate modulation period is 27.3 $\mu$m. This periodic modulation in the WGM resonator may be achieved by periodic poling of the cavity material. FIG. 8 shows the mode profiles of the pump and signal beams in the OPO in the WGM resonator formed with the Z-cut $LiNbO_3$. The volumes of the pump mode, the signal-idler mode, and modes' overlap are $1.7\times10^{-7}$, $4\times10^{-7}$, and $1.5\times10^{-7}$ $cm^3$, respectively. The mode volumes can also be estimated by use of the asymptotic expression of $V_p \approx 2\pi R \times 2R(2\pi/v_p)^{1/2}\times$ ($R/v_p^{2/3}$), where $2\pi R$ is the length of the cavity rim, $2R(2\pi/v^p)^{1/2}$ is the mode size in the Z direction, and ($R/v_p^{2/3}$) is the radial size of the mode. The optimization of the poled WGM resonator is specific to the pump wavelength. In this example, the radius of the spherical WGM resonator is 0.64 mm and the pump wavelength is 1064 nm.

The radius of the cavity is contained only in the ratio of ($R/\lambda$) in Equation (1). Therefore the phase matching established by the periodic poling of the cavity material is stable with respect to the radius change, and the radius change may be compensated for by fine tuning of the pump laser frequency.

The threshold for parametric oscillation in the above WGM cavity may be estimated as follows. The interaction energy between the pump and the signal modes may be written as $$v = \int \chi^{(2)} E_p E_s^2 dV, \quad (5)$$

where the second-order nonlinear coefficient $\chi^{(2)}$ varies with position in the WGM cavity, $E_p$ and $E_s$ are the pump and the signal mode amplitudes, respectively (where the signal mode coincides with the idler mode), and V is the volume of the WGM cavity. The mode amplitudes can be approximately expressed as follows:

$$E_p = \left(\frac{2\pi h w_p}{\varepsilon_p V_p}\right)^{1/2} \Psi_p(r) \exp(iv_p\phi) a_p \exp(-i\omega_p t) + \text{adjoint}, \quad (6)$$

$$E_s = \sqrt{\frac{2\pi h \omega_s}{\varepsilon_s V_s}} \Psi_s(r) \exp(iv_s\phi) a_s \exp(-i\omega_s t) + \text{adjoint}, \quad (7)$$

where $a_i$ and $a_i^\dagger$ (i=p, s) are annihilation and creation operators for the mode, $\Psi_p(r)$ and $\Psi_s(r)$ are the normalized mode spatial profiles such that $V_i = \int |\Psi_i(r)|^2 dV$ (i=p,s), $\omega_p$ and $\omega_s$ are the mode frequencies, and $\varepsilon_p$ and $\varepsilon_s$ are the susceptibilities of the material for the pump and the signal modes, respectively. It is assumed that the nonlinearity of the medium is modulated such that it has a Fourier component that matches the signal and pump modes: $\chi^{(2)} \rightarrow 2\tilde{\chi}^{(2)} \cos[(v_p - 2v_s)\phi]$.

Based on the above, the interaction Hamiltonian under the slowly varying amplitude and phase approximation can be expressed as the following:

$$H = hg[(a_s)^2 a_p + a_p a_s^2], \quad (8)$$

where the coupling constant is $$g = 2\pi \omega_s \frac{\tilde{x}^{(2)}}{\varepsilon_s} \frac{V_{pss}}{V_s} \left(\frac{2\pi h w_p}{\varepsilon_p V_p}\right)^{1/2}, \quad (9)$$

and $V_{pss} \int \Psi_p \Psi_s^2 dV < V_p$, and $V_s$ is the mode overlap integral. Using this Hamiltonian, equations of motion are:

$$\dot{a}_p = -\gamma_p a_p - iga_s^2 + F_p, \quad (10)$$

$$\dot{a}_s = -\gamma_s a_s - 2iga_s a_p + F_s, \quad (11)$$

where $F_p$ and $F_s$ are the Langevin forces and $\gamma_p$ and $\gamma_s$ are pump and signal decay rates, respectively. The expectation value $<F_p>$ describes the pumping from outside the system. The following expression can be derived $|F_p|^2/\gamma_p^2 = 4W_p Q_p/(h\omega_p^2)$, where $Q_p = \omega_p/(2\gamma_p)$ is the mode quality factor and $W_p$ is the power of the pump radiation. Solving Eqs. (10) and (11) in a steady state and neglecting quantum fluctuations, the expectation value of the generated photon number for the signal is:

$$|a_s|^2 = \frac{\gamma_p \gamma_s}{2g^2}\left(\frac{2g}{\gamma_s \gamma_p}|\langle F_p \rangle| - 1\right). \quad (12)$$

This results leads to the following threshold condition for the parametric oscillation:

$$W_p \geq \frac{\varepsilon_p \varepsilon_s^2}{512\pi^3 [\tilde{x}^{(2)}]^2}\left(\frac{V_s}{V_{pss}}\right)^2 \frac{\omega_p V_p}{Q_s^2 Q_p}. \quad (13)$$

For realistic parameters $V_{pss}/V_s = 0.5$, $V_p = 2 \times 10^{-7}$ cm$^3$, $\varepsilon_p = 4.6$, $\varepsilon = 4.5$, $\tilde{\chi}^{(2)} = 10^{-7}$ CGSE, $\omega_p = 2 \times 10^{15} s^{-1}$, $Q_s \cong Q_p \cong 10^7$, the threshold value is about 0.1 $\mu$W, which is orders of magnitude less than that of other OPO devices, e.g., 0.5 mW for similar wavelengths. This result suggests that that the toroidal WGM cavity is better than the total-internal-reflection cavity used in other OPOs pumped at 1064 nm. The oscillation threshold depends on the mode volume and the mode overlap integral. Hence, the mode volume may be reduced and the integral in WGM cavity may be increased to reduce this OPO threshold power.

Figure 10:
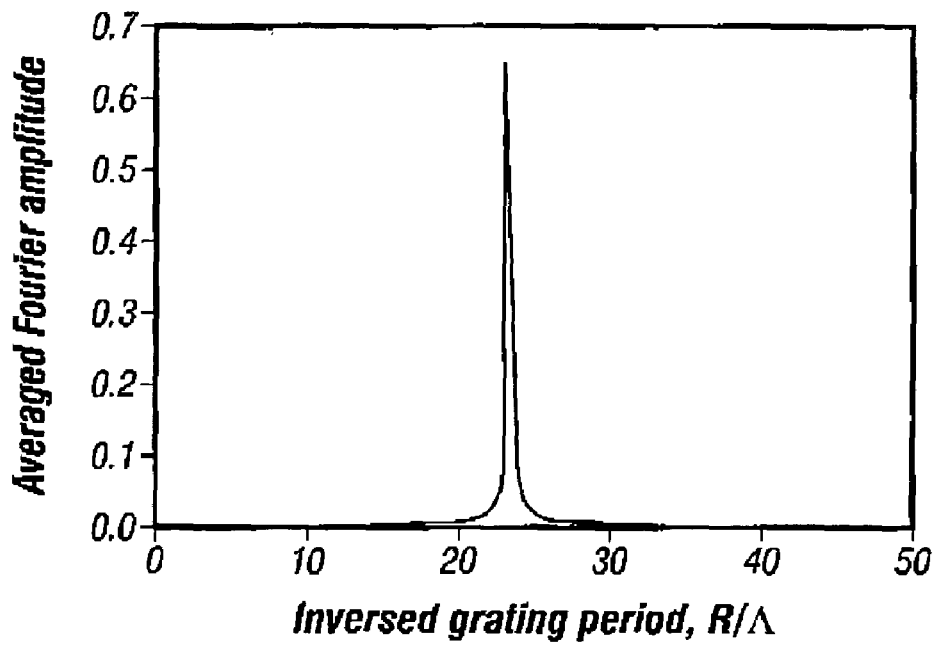
FIG. 10 shows the calculated envelope function for amplitudes of Fourier coefficients of the symmetrically arranged sectors in a nonlinear WGM in FIG. 9A for R=0.64 mm and pump wavelength at 1064 nm.

FIGS. 9A and 9B show two exemplary sector configurations for a nonlinear WGM resonator. FIG. 9A shows a first poling geometry which is symmetric with respect to the center of the cavity. Under this design, the nonlinear index coefficient is modulated with a periodic reversal of the sign of the second-order nonlinear coefficient and the corresponding Fourier coefficient for the first (fundamental) harmonic is $2/\pi$, as in a periodically poled bulk material under the quasi phase matching condition. FIG. 10 shows the dependence of the Fourier coefficients on the inverse poling period for the nonlinear WGM resonator in FIG. 9A, where the discrete spectrum is averaged and the envelope function is plotted as a function of the inversed grating period.

Fabrication of centrally symmetric poling as in FIG. 9A can be a difficult task. It may be economical to use a slice of commercially available periodically poled LiNbO$_3$ to form a WGM resonator. FIG. 9B shows one implementation of this resonator where the cavity has poled parallel stripe sectors instead of symmetric sectors. For such poling, a wave that travels close to the cavity surface sees a nonlinear grating with a changing period.

Figure 11:
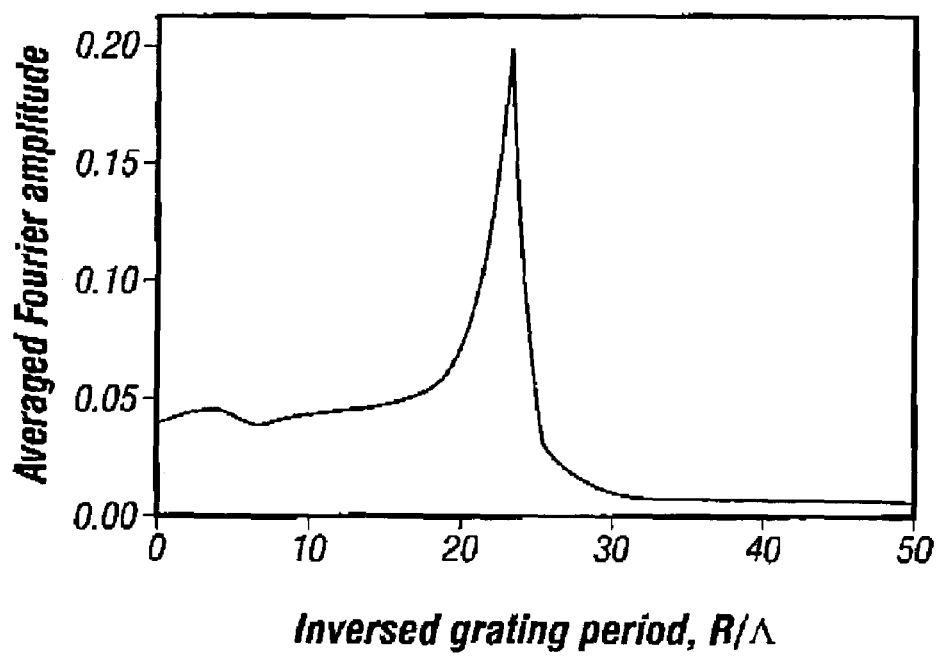
FIG. 11 shows the calculated envelope function for amplitudes of Fourier coefficients of the parallel stripe sectors in a nonlinear WGM in FIG. 9B for R=0.64 mm and pump wavelength at 1064 nm.

FIG. 11 shows an envelope function for the Fourier decomposition for the parallel stripe poling pattern in FIG. 9B. Because the grating does not have a fixed step with respect to the electromagnetic wave, the maximum Fourier component is less than in the more efficient symmetric poling in FIG. 9A. As a result, the threshold power for the OPO in the resonator in FIG. 9B is higher than that of the resonator in FIG. 9A, e.g., by a factor of 11 in the specific example in FIG. 11. However, the spectrum of the grating is broad enough to simplify working with the cavity and to make possible multifrequency parametric oscillations in the system.

It is further contemplated that the parallel stripe poling may use nonequidistant poling stripes. Such nonequidistant poling stripes may create more-periodic poling and change the spectrum. Nonequidistant poling stripes and other complex poling structures may be implemented to achieve the desired quasi phase matching conditions.

Figure 12:
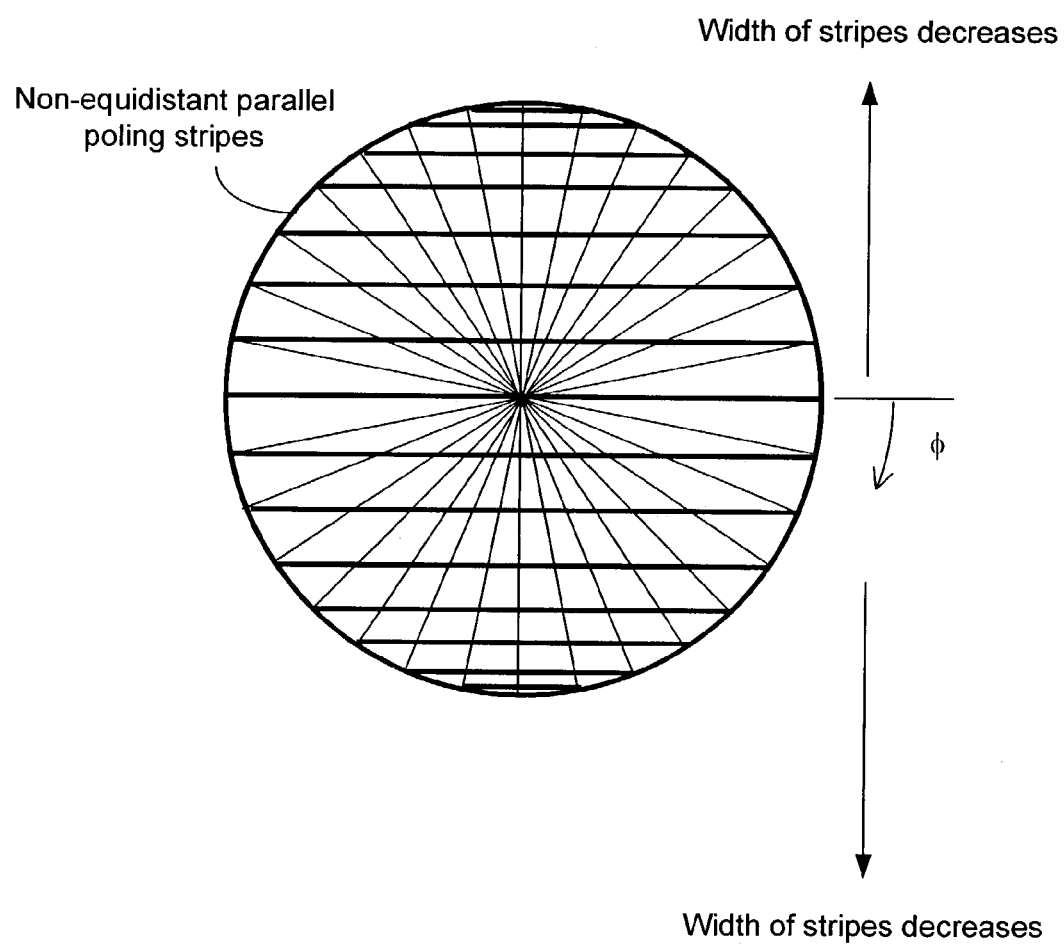
FIG. 12 shows one exemplary nonlinear WGM-having non-equidistant parallel poling stripes.

FIG. 12 shows one exemplary nonlinear WGM having non-equidistant parallel poling stripes where the widths of stripes decrease from the center of the WDM to the outer edge of the WGM along the direction perpendicular to the poling stripes. In one implementation, the equator of the WGM may be divided into sections, e.g., with equal arc angles, to define the parallel poling stripes with varying widths. In particular, if the period changes as a function of $\sin\phi$, then poling period experienced by a WG mode may be effectively periodical because as the WG mode propagates around the periphery of the resonator. In FIG. 12, the thick parallel lines are domain boundaries between oppositely poled material and thin lines denote equal angular sectors.

Notably, nonlinear WGM resonators described here may also be used to produce nondegenerate parametric interactions. Because of the low threshold for the OPO operation, such a nonlinear WGM resonator may also be reversed and used as a detector of long-wavelength radiation by means of its direct upconversion into light. The maximum wavelength of the radiation is determined by the cavity size. To maintain low radiative losses, the order of the cavity mode should be sufficiently large. For example, for detection of radiation, the cavity should have a radius of at least 3.5 mm in some applications.

Moreover, periodically poled or otherwise poled nonlinear materials may be used for construction of electro-optic modulators based on WGM. The parametric interaction among running light-wave and microwave radiation in a periodically poled WGM cavity as well as single-sideband electro-optical modulation by use of nonequidistant modes of a WGM cavity may also be possible. In such devices, the nonlinear optical material for the WGM resonator exhibits an electro-optical effect. One or more electrodes may be formed on the WGM resonator to apply a control electrical signal to change the index. This change in the index causes modulation of the light produced by the nonlinear interaction based on the quasi phase matching condition. The control signal may co-propagate with the WGM modes to circulate around the WGM resonator.

Hence, a whispering-gallery-mode dielectric cavity with a periodically poled nonlinear material may be designed to have an appropriate periodic poling for compensation for the phase mismatch among cavity modes caused by cavity material dispersion and geometrical cavity dispersion. The potential high-quality factors and small volumes of the WG modes in such resonators may be used to create an ultra low-threshold optical parametric oscillator and other devices.

Although only a few implementations are disclosed, it is understood that variations and enhancements may be made.

What is claimed is:

1. A device, comprising an optical resonator including a nonlinear optical material to support whispering gallery modes, and an optical coupler to couple light into or out of said optical resonator, wherein said nonlinear optical material includes a plurality of sectors within said optical resonator and nonlinear coefficients of two adjacent sectors are oppositely poled.

2. The device as in claim 1, wherein said resonator is a sphere.

3. The device as in claim 1, wherein said optical resonator has a non-spherical shape.

4. The device as in claim 1, wherein said optical resonator has a disk shape.

5. The device as in claim 1, wherein said optical resonator has a ring shape.

6. The device as in claim 1, wherein said sectors are symmetrically arranged with respect to a center of said optical-resonator.

7. The device as in claim 1, wherein said sectors are parallel stripes across said optical resonator.

8. The device as in claim 1, wherein said nonlinear optical material is $LiNbO_3$.

9. The device as in claim 1, wherein said nonlinear optical material exhibit a second-order nonlinear optical effect.

10. A device, comprising an optical resonator comprising a nonlinear optical material to support whispering gallery modes, wherein said nonlinear optical material comprises a plurality of sectors within said optical resonator and nonlinear coefficients of two adjacent sectors are oppositely poled, wherein said optical resonator includes a portion of a sphere.

11. A device, comprising an optical resonator which comprises a nonlinear optical material to support whispering gallery modes, wherein said nonlinear optical material comprises a plurality of sectors within said optical resonator and nonlinear coefficients of two adjacent sectors are oppositely poled, wherein said optical resonator has a spheroidal shape.

12. A method, comprising:
providing an optical resonator having a nonlinear optical material to support whispering gallery modes, wherein the nonlinear optical material includes a plurality of sectors across the optical resonator and nonlinear coefficients of two adjacent sectors are oppositely poled; and
coupling an optical beam at a first wavelength into the optical resonator to convert light at the first wavelength into light at a second, different wavelength.

13. The method as in claim 12, wherein the conversion of light includes a second harmonic generation process, where the second wavelength is one half of the first wavelength.

14. The method as in claim 12, wherein the conversion of light includes a parametric oscillation process, the method further comprising coupling another optical beam at a third wavelength into the optical resonator.

15. The method as in claim 12, wherein the sectors are symmetrically arranged with respect to a center of the optical resonator.

16. The method as in claim 12, wherein the sectors are parallel stripes across the optical resonator.

17. The method as in claim 12, wherein the nonlinear optical material exhibits an electro-optical effect, and the method further comprising applying a modulation electric signal to the optical resonator to control the refractive index to modulate the light at the second wavelength.

18. A device, comprising an optical resonator configured to support whispering gallery modes and including a nonlinear optical material exhibiting a second-order nonlinear effect, wherein said nonlinear optical material includes a plurality of sectors within said optical resonator and said sectors are in a quasi phase matching configuration for said second-order nonlinear effect for light coupled in said optical resonator.

19. The device as in claim 18, wherein said optical resonator includes at least a portion of a sphere.

20. The device as in claim 18, wherein said optical resonator has a non-spherical shape.

21. The device as in claim 20, wherein said optical resonator has a spheroidal shape.

22. The device as in claim 18, wherein said sectors are symmetrically arranged with respect to a center of said optical resonator.

23. The device as in claim 18, wherein said sectors are parallel stripes across said optical resonator.

24. The device as in claim 23, wherein said sectors have different widths.

25. The device as in claim 18, wherein said nonlinear optical material exhibits an electro-optical effect, and said device further comprising an electrode to apply an electrical signal to modulate light that is involved in said second-order nonlinear effect.

* * * * *